(12) United States Patent
Wright, Jr. et al.

(10) Patent No.: US 9,368,959 B2
(45) Date of Patent: Jun. 14, 2016

(54) DISPLACEMENT SAFETY SYSTEM FOR ELECTRICAL CHARGING STATIONS

(76) Inventors: Robert W. Wright, Jr., Louisville, KY (US); James E. Maddox, Louisville, KY (US)

(*) Notice: Subject to any disclaimer, the term of this patent is extended or adjusted under 35 U.S.C. 154(b) by 801 days.

(21) Appl. No.: 13/573,265

(22) Filed: Sep. 6, 2012

(65) Prior Publication Data

US 2013/0241479 A1    Sep. 19, 2013

Related U.S. Application Data

(60) Provisional application No. 61/573,477, filed on Sep. 6, 2011.

(51) Int. Cl.
| | |
|---|---|
| *F16P 3/14* | (2006.01) |
| *H02H 5/10* | (2006.01) |
| *B60L 11/18* | (2006.01) |
| *B67D 7/08* | (2010.01) |
| *B60L 3/00* | (2006.01) |
| *H02J 7/00* | (2006.01) |

(52) U.S. Cl.
CPC .. *H02H 5/10* (2013.01); *B60L 3/00* (2013.01); *B60L 11/1811* (2013.01); *B60L 11/1825* (2013.01); *B67D 7/08* (2013.01); *H02J 7/0029* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC ............ B60L 11/1811; B60L 11/1825; B60L 11/1861; H02H 5/10
USPC ....................................................... 307/326
See application file for complete search history.

(56) References Cited

U.S. PATENT DOCUMENTS

| | | | |
|---|---|---|---|
| 5,091,855 A | 2/1992 | Umehara | |
| 5,202,617 A | 4/1993 | Nor | |
| 5,461,298 A | 10/1995 | Lara | |
| 5,462,439 A | 10/1995 | Keith | |
| 5,548,200 A | 8/1996 | Nor | |
| 5,646,500 A | 7/1997 | Wilson | |
| 5,696,367 A | 12/1997 | Keith | |
| 5,764,729 A * | 6/1998 | Black | H04M 11/04 340/566 |
| 7,906,937 B2 | 3/2011 | Bhade | |
| 2009/0021213 A1* | 1/2009 | Johnson | B60L 11/005 320/109 |
| 2010/0013434 A1 | 1/2010 | Taylor-Haw | |
| 2010/0019723 A1 | 1/2010 | Ichikawa | |
| 2010/0039062 A1 | 2/2010 | Gu | |
| 2010/0049396 A1 | 2/2010 | Ferro | |
| 2010/0134067 A1 | 6/2010 | Baxter | |
| 2010/0207588 A1 | 8/2010 | Lowenthal | |

(Continued)

*Primary Examiner* — Thienvu Tran
*Assistant Examiner* — David M Stables

(57) ABSTRACT

A safety circuit for disconnecting the power feed to an EV (electrical vehicle) charging enclosure or gasoline station fuel pump enclosure in the event that the enclosure is partially or totally dislodged from the foundation and dangerously high voltage has been exposed due to underground conduits being torn apart and electrical cables being exposed and in contact with sheet metal cabinets and other metal parts, thus creating the possibility of an explosion or the electrocution of a user or bystanders. The safety circuit comprises at least two proximity sensors, each of which transmits a signal into a control circuit which causes the power feed to the enclosure to be disconnected at the source when either or both of the proximity sensors inform the control circuit that the station has moved either vertically or horizontally more than a few thousandths of an inch.

3 Claims, 5 Drawing Sheets

(56) References Cited

U.S. PATENT DOCUMENTS

| | | |
|---|---|---|
| 2010/0283426 A1 | 11/2010 | Redmann |
| 2011/0029144 A1 | 2/2011 | Muller |
| 2011/0095723 A1 | 4/2011 | Bhade |
| 2011/0133693 A1 | 6/2011 | Lowenthal |
| 2011/0140656 A1 | 6/2011 | Starr |
| 2011/0147174 A1 | 6/2011 | Chuang |

* cited by examiner

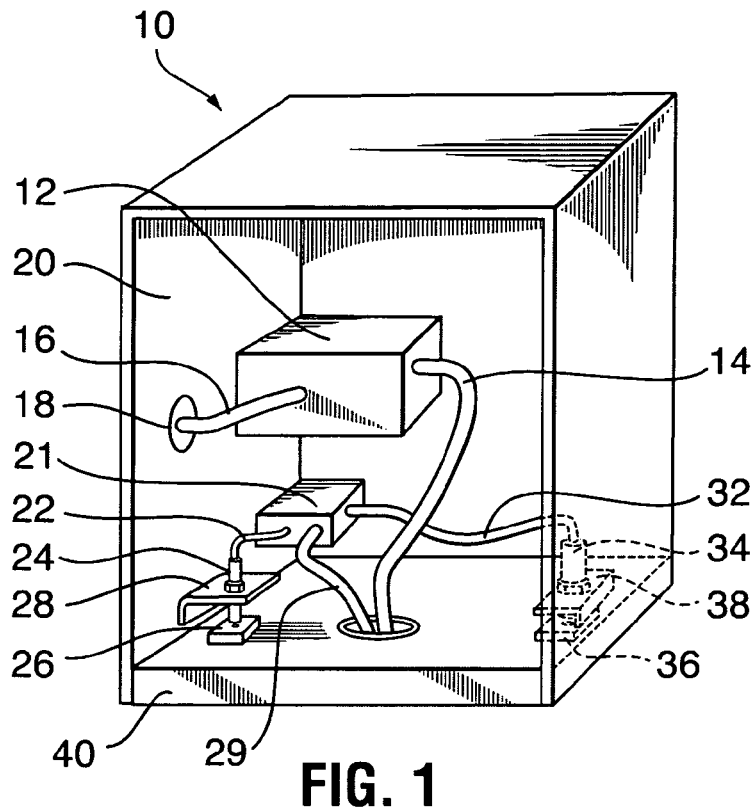
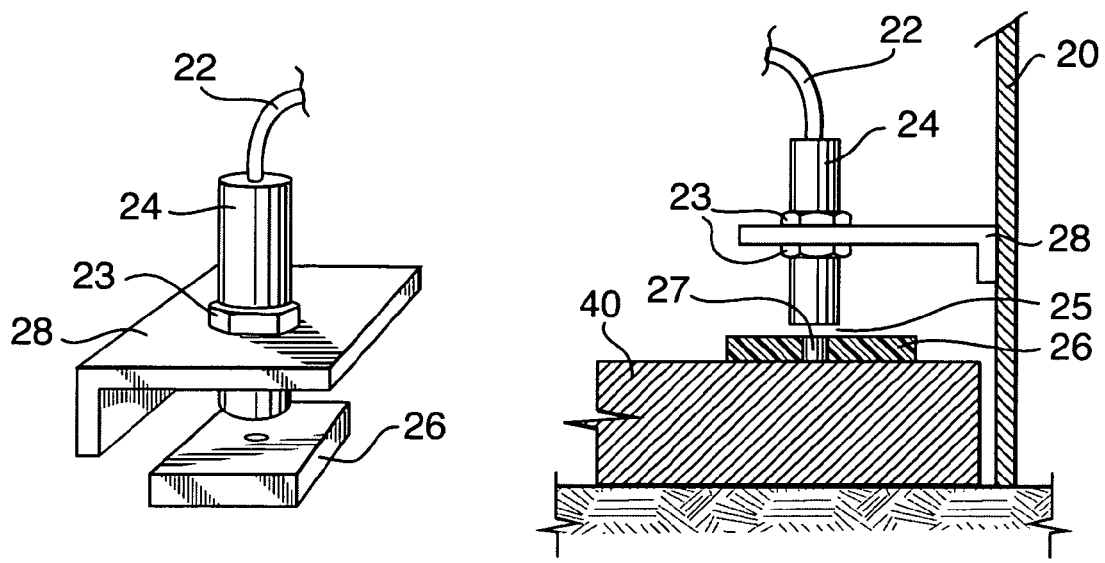
FIG. 1
FIG. 2
FIG. 3

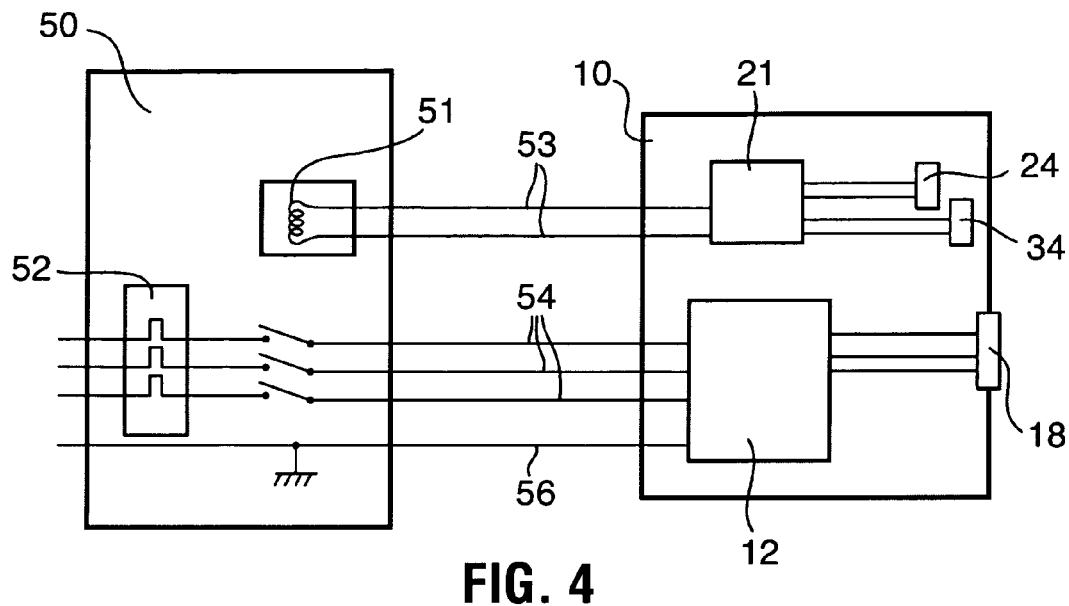
FIG. 4
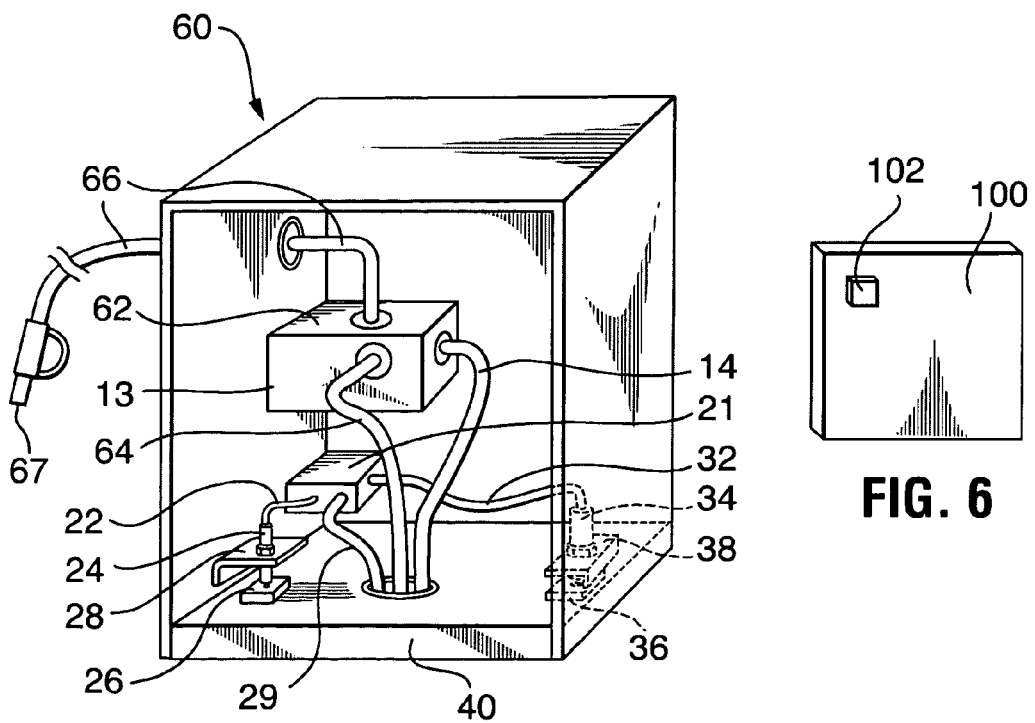
FIG. 5
FIG. 6

DISPLACEMENT SAFETY SYSTEM FOR ELECTRICAL CHARGING STATIONS

This application claims priority from U.S. Provisional Patent Application No. 61/573,477, filed Sep. 6, 2011 which is incorporated by reference herein in it's entirety.

TECHNICAL FIELD

The present invention relates to the field automotive electrical charging enclosures or fuel pump enclosures and more particularly to safety circuits or devices which disconnect the electrical power feed to the enclosure in the event that the enclosure has been partially or totally dislodged from the foundation and dangerous high voltage is exposed.

BACKGROUND OF THE INVENTION

Plugin electric vehicle offer better fuel economy, lower emissions and good acceleration. Automotive manufacturers are introducing poly-in electric vehicles to the consumer market. At least one industry forecast predicts up to 400,000 battery electric vehicles in North America by the year 2020.

Quick chargers supply a connection to the grid for drivers on the go with a fast direct charge of electricity needed to refill the battery. A typical quick charger includes a rapid DC charging electric vehicle supply equipment housed in a free standing structure constructed of stainless steel or the like. At least some quick chargers operate with an input of (162 A @208V, 3 phase 3 wire 50/60 Hz) using a direct current flow (output 125 A@400 VDC and 50 KW maximum), to charge the electric vehicle's battery in 20-30 minutes typically connecting to the charger via a CHAdeMo compliant power connector or equivalent. The electric vehicle and the quick charger include safety checks to verify it is connected using 5 pins before DC power is available. The electric vehicles are also required to have an interlock deactivating the ignition while connected to the charger.

Gasoline and diesel pumps at filling stations are usually guarded with heavy duty posts called bollards which are typically painted bright yellow for high visibility and are located at each of the four corners of the fuel service islands and usually close to the pumps. These posts are generally at least four inches in diameter and are generally steel pipes which may concrete tilled or are constructed of steel reinforced concrete. These posts extend down into the foundation for increased strength. The purpose of the bollards is to prevent an out-of-control vehicle from striking a fuel pump and partially or totally dislodging the pump and cabinet from the foundation, at which point an explosion may occur due to the presence of leaking fuel and possible sparking of electrical wires. Furthermore, electrical wiring may be exposed and cause severe or lethal shocks to anyone in the adjacent area. However, bollards typically don't cover the entire area around the fuel pumps and an out-of-control vehicle approaching from a given angle is capable of dislodging a pump and causing the dangerous situation as described above. Further, bollards are sometimes installed incorrectly or may have been knocked loose and cannot provide protection as originally intended.

Additionally, with the advent of electrical cars and hybrid vehicles, EV or electrical vehicle charging stations are appearing in many location throughout the world. Many of these charging stations are similarly protected by bollards. And, as stated above, bollards don't totally prevent a vehicle from dislodging a charging station from a foundation. Obviously, such charging stations have high voltage wiring within the enclosure, generally entering from underground conduits within the foundation and going on up into the enclosure. These EV charging stations pose a possible more serious electrical hazard than do common fuel pumps. Consequently, serious danger is present when the charging station enclosure is dislodged and high voltage wiring is exposed.

There is a possibility of damage to an EV charging station or other high voltage system due to a collision or being struck with a force sufficient to cause component failure, physical damage, systemic damage, or physical displacement; damaging high winds resulting from natural occurrences such as hurricane, tornado, etc.; high water or flooding events; excessive/violent/sustained physical motion/movement/shaking such as an earthquake; physical damage resulting from vandalism or terroristic act; and/or a high heat beyond that which the system is capable of withstanding.

The damage may be sufficient to cause the enclosure, pole/post, or supporting structure to become completely dislodged from its foundation, mount, or supporting system; become partially dislodged from its foundation, mount, or supporting system; sustain physical damage; sustain damage to the components contained/housed/enclosed/supported; and/or overheat causing damage to the components contained/housed/enclosed/supported thereby.

Moreover, exposure of the dangerously high voltage power feed, and its' conductors, terminals, or wiring causing physical contact with conductive metals, liquids, or a person/animal creates the possibility for shock or electrocution and fire or explosion. Exposure of the dangerously high voltage power feed cabling, conductors, terminals, or wiring causing electrification by proximity to conductive metals, liquids, or person/animal could also create the possibility for shock or electrocution and fire or explosion.

In the event that a fuel pump or an EV charging station is exposed to a substantial enough force to move the pump on or from the originally mounted position on the foundation, a safety system should be in place to disconnect the incoming power at the source. Safety circuits which disconnect the incoming power in the event of a ground fault or in the event of a current overload are common in fuel pumping stations and EV charging stations. A ground fault or over current circuit might disconnect the incoming power to a dislodged station if the dislodging resulted in a ground fault or an over current situation, but it is possible that underground conduit may be broken and wiring exposed without creating a ground fault or and over current situation. The present invention, however, provides a safety circuit which disconnects incoming power when the station enclosure has become dislodged and has moved by at least a few thousandths of an inch, either horizontally or vertically, to remove the chance of electrical shocks or electrocution of bystanders who are unaware of such dangers.

Eaton Corporation, having a location in Cleveland, Ohio, USA, manufactures electric vehicle charging stations such as the POW-R-STATION LEVEL 2 and DC quick chargers (Electric Vehicle Supply Equipment (EVSE)), for the plug in electric vehicle industry. As set forth in Eaton's brochure and/or on-line (eaton.com) information, the power station electric vehicle charging stations supply the connection to the grid where vehicles park on the street, garage, or parking lot and provide the vehicle's onboard charge control circuit with energy to refill the battery. The 2 POW-R-STATION is designed for indoor or outdoor use and can be wall mounted for residential or commercial garage installations or can be free standing with a pedestal configuration. Usin: an industry standard J1772 30 A or 70 A connector, the charging station can fill a depleted all electric vehicle battery in as little as four hours. The driver simply connects the J1772 connector to the electric vehicle and the EV charging station determines the vehicle type and proper charging characteristics by providing a 'wake-up' signal through the connector. The charging system indicates the proper maximum line current (ALC) for that vehicle depending on the circuit size or the commands of a load management system and/or the requirements of the utility.

DESCRIPTION OF THE RELATED ART

In US Patent Application Publication No. 20110029144, Muller et al. teach an EV charger which includes over current control and ground fault interrupt circuitry to protect users from high voltage. However, Muller is silent with respect to preventing the resulting danger caused when the charging system enclosure is damaged or dislodged by an errant vehicle. Ground fault circuitry and over current protection will not guarantee the safety of bystanders in such an event.

In US Patent Application Publication No. 20110095723, Bhade et al. teach an EV charging station which includes a computer network which monitors over current and ground fault interrupt circuitry to protect users from high voltage. When the power is disconnected from the station due to a fault, the power can be remotely reconnected by the computer network. However, as with Muller above, Bhade does not guard against the resulting danger caused when the charging system enclosure is damaged or dislodged by an errant vehicle. Ground fault circuitry and over current protection will not guarantee the safety of bystanders in such an event.

In US Patent Application Publication No. 2010207588, Lowenthal et al. teach an EV charging station which includes circuitry which particularly responds to an inadvertent disconnection of the charging cable at the vehicle. The power is immediately removed from the inadvertently disconnected cable, thus making the cable safe for a user to handle and reconnect the cable if desired. However, as with Muller and Bhade above, Lowenthal does not protect users or bystanders from the resulting danger caused when the charging system enclosure is damaged or dislodged by an errant vehicle.

In US Patent Application Publication No. 20110133693, Lowenthal et al. teach a residential EV charging station which monitors the power being used by other devices in the residence. If the combined power used by the charging system and the rest of the appliances would cause an overload which would trip the main circuit breaker in the house, then the charging system automatically lowers or totally interrupts the charging current going to the electrical vehicle batteries to prevent such an overload. However, as with Muller and Bhade above, Lowenthal does not consider the resulting danger caused when the charging system enclosure is damaged or dislodged by an errant vehicle.

SUMMARY OF THE INVENTION

The present invention provides a safety circuit for disconnecting electrical service in the event that the enclosure, pole/post, or supporting structure is exposed to catastrophic accident, incident, occurrence, or natural disaster occurs involving a utility power distribution system from the grid to sub-transmission/primary distribution/local distribution; and/or an electrical distribution/feed to an electric vehicle (EV) charging station, gasoline station pump, propane distribution system, chemical tank farm, petroleum tank farm, fuel farm, or highway/roadway/parking light pole & or lighting system.

In accordance with the present invention, there is provided an electrical vehicle charging system comprising an enclosure including a power converter unit capable of receiving incoming power and converting the incoming power to the proper DC voltage and current levels to charge the batteries of the electrical vehicle. The enclosure is mounted on a foundation which is fixedly secured to the ground. The enclosure has one proximity sensor mounted to each of two opposing walls therein. The proximity sensors monitor the presence of two respective targets which are mounted onto the foundation. The proximity sensors each input a signal to control circuitry contained within the enclosure which inform the control circuitry of the presence or absence of the targets. The control circuitry sends a trip signal to a remotely located shunt trip main circuit breaker in the situation wherein one or both of the proximity sensors senses that no target is present, thus causing the main circuit breaker to remove power from the enclosure.

It is an object of this invention to provide a safety circuit which may be added to the normal circuitry within a fuel pumping station or an EV charging station which compares the present position of the station with a the originally installed position on the station foundation and, when the station has moved more than a selected amount, the power coming into the station is automatically removed, thus removing dangerous high voltage which may be exposed by such movement of the station with respect to the foundation.

It is an object of this invention to provide the safety circuit described above which includes at least two proximity detectors monitored by control circuitry which will remove the incoming power to the station in the event that one or more of the proximity detectors informs the control circuitry that the station enclosure has moved horizontally, vertically or a combination of the two, by a selected amount.

It is an object of the present invention to utilize proximity sensors to allow non-contact detection of objects by sensors such as metallic (inductive), capacitive or ultrasonic sensors to detect an unintentional displacement of the service cabinet or cabinet parts.

It is an object of the present invention to provide a safety circuit utilizing sensors selected from the group comprising, consisting essentially of, or consisting of contact displacement sensors, contact displacement meters, non-contact displacement sensors, non-contact displacement meters, magnetic bield, laser, ultrasonic wave, dial gauge, differential transformer, fixed reference transformer, mass-spring transformer, absolute position encoder, cable extension, capacitive, eddy current, fiber optic, Hall Effect, inductive, laser micrometer, linear fixed-reference transducer, mass-spring or seismic transducer, displacement transducers, piezoresistive accelerometers, servo accelerometers, force gages, ground sensing, impedance head, laser Doppler vibrometers (out of plane, scanning, and in-plane, rotational), precision microsensors, accelerometer preamplifiers, electro-dynamic transducers, electro-optical displacement, tilt and vibration sensors, inclinometers, tilt sensor, angle sensor, acceleration sensor, shock sensor, vibration sensor, precision micro, rugged package sensors, encoder, linear potentiometer, linear variable differential transformer, magneto resistive, change in position, optical triangulation, photo-electric, position probing, incremental encoder, rotary encoder, photo-junction, solenoid switching, time of flight optical, ultrasonic, variable resistance, limit switch feedback, and wireless position monitors, heat sensor, high temperature sensor, water level detector, water level sensor, water detection tape, severed cable detector, severed cable sensor, cover tamper sensor, cover tamper switch, intrusion detector, intrusion sensor, and ground sensing sensors/system.

It is an object of the present invention to detect when either sensor informs the control circuit that the "Protected System" is being physically moved either vertically, horizontally, laterally more than a few thousandths of an inch; is being subjected to pre-determined threshold of force, inertia, or gravity; is being subjected to pre-determined threshold of high water level; has a cable or cable-component cut/severed; is being subjected to pre-determined threshold of high heat; and/or has the access/service panel opened or tampered with which transmits a signal to a control circuit. The signal causes the main power feed (circuit breaker or disconnect) to the protected system to be automatically disconnected; and a canned message is sent via Ethernet, wirelessly, or other methodology to the owner or monitoring entity.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 1 is an internal view of an EV charging station enclosure of the present invention.

FIG. 2 is perspective view of one of the proximity detectors along with a detector bracket and a target holder.

FIG. 3 is a side view of the proximity detector and bracket on the enclosure wall, and the target holder mounted on the foundation.

FIG. 4 is an electrical control schematic of the present invention.

FIG. 5 is an internal view of a fuel pump enclosure including the safety system of the present invention.

FIG. 6 is a top view of an electronic board including a movement sensing unit.

DESCRIPTION OF THE PREFERRED EMBODIMENTS

Figure 7:
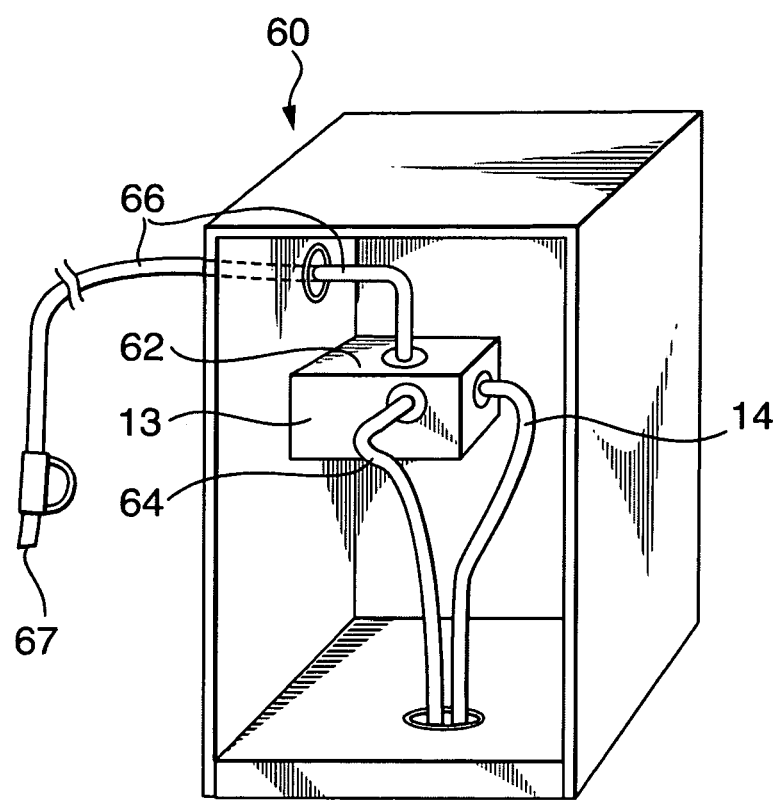
FIG. 7 is an internal view of a fuel pump enclosure wherein is contained an electronic board with an embedded motion sensor.

In accordance with the present invention, there is provided a safety system for an EV (electrical vehicle) charging station enclosure which monitors the originally installed position of the enclosure relative to the foundation on which the enclosure is installed and when the enclosure has moved on or from the foundation by more than a few thousandths of an inch, the safety system removes any high voltage power which is being fed into the enclosure. Additionally, the same safety system is used on a fuel pump enclosure which is common in a typical gas station to prevent danger from exposed electrical cables in the event of damage or dislodging of the fuel pump enclosure.

FIG. 1 shows an EV charging station 10 including an enclosure 20 mounted onto a foundation 40. The foundation 40 is preferably reinforced concrete or any proper foundation material which is rigidly secured to the ground. Enclosure 20 includes a power converter unit 12 which is supplied by power coming into the station 10 from underground and through cable 14. It is anticipated that the incoming power is in the range of 110 to 480 VAC or more and may be single phase or three phase power. Power converter 12 converts this incoming power to the proper DC voltage and current level needed to charge the vehicle batteries. This charging DC voltage feeds out of converter unit 12 through cable 16 to an outlet 18 which is suitable for connection with the vehicle battery connector.

Proximity sensors 24 and 34 are rigidly fastened to the walls of enclosure 20 by their respective angle brackets 28 and 38. Brackets 28 and 38 are welded or attached by fasteners to enclosure 20. Jack nuts 23 are fastened securely on either side of bracket 28 and 38 as shown in FIGS. 2 and 3 to locate and fix the sensors in the preferred position with respect to targets 27.

Proximity sensors 24 and 34 are metallic sensors known as inductive probes which are digital sensors, that is, they output either of two signals, one signal meaning that metal is being sensed and the other signal meaning that no metal is present. Control unit 21 monitors the signals from each of the sensors 24 and 34. When either sensor outputs a signal which says that metal is no longer being sensed, control unit 21 outputs a signal on cable 29 to trip or disable the power coming into enclosure 20.

Non metallic target holder 26 in FIGS. 2 and 3 contains a small metallic plug 27 in the center of the holder. A gap 25 is set between the end of sensor 24 and the target 27. Only the target 27 is metal. The holder is non-metallic. Because target 27 is small, a smaller amount of movement will cause the proximity sensor to sense the absence of the target. In other words, the proximity probe is made to be more sensitive to movement of the enclosure by sensing a smaller target. It is anticipated that the gap is set so that just a slight upward or side movement is enough to cause the sensor to switch the output to a signal which says there is no metal present. This in turn causes the system to trip or remove the incoming voltage. The same gap is set between sensor 34 and the respective target.

The schematic in FIG. 4 shows the EV charging enclosure 10 and power feed enclosure 50. Enclosure 50 is located in a remote area which is several feet away from enclosure 10, such as on a utility pose or on the wall of a store. Power wires 54 and safety ground wire 56 are contained within cable 14, shown in FIG. 1. Control wires 53 are contained within cable 29. Cables 14 and 29 connect enclosures 10 and 50. It is anticipated that cables 14 and 29 run through underground conduits for safety reasons. The proximity sensors 24 and 34 are connected to control unit 21. When an unsafe condition exists due to enclosure 10 having been moved from or dislodged on the foundation 40, this condition is sensed by either or both of sensors 24 and 34. Control unit 21 responds by applying a voltage across wires 53 which energizes the trip coil 51 on the main power shunt trip breaker 55. Energizing coil 55 causes the contacts of breaker 55 to open and thus, the power wires in cable 14 now carry no voltage and are thus safe to touch.

Two sensors 24 and 34 with respective targets are used because with only one sensor, a situation could occur where the enclosure 10 is damaged but only twisted on the foundation while leaving the one sensor still sensing the metal target. In this situation, the incoming power would not be switched off and a dangerous situation is present. With two sensors mounted on opposing walls, at least one would give a fault condition if the enclosure was twisted around on the foundation.

Another embodiment of the EV charging system includes an enclosure 10 mounted on the side of an outer wall of a service station at a height of about to 5 feet in the air rather than one that is mounted on a foundation on the ground.

Figure 8:
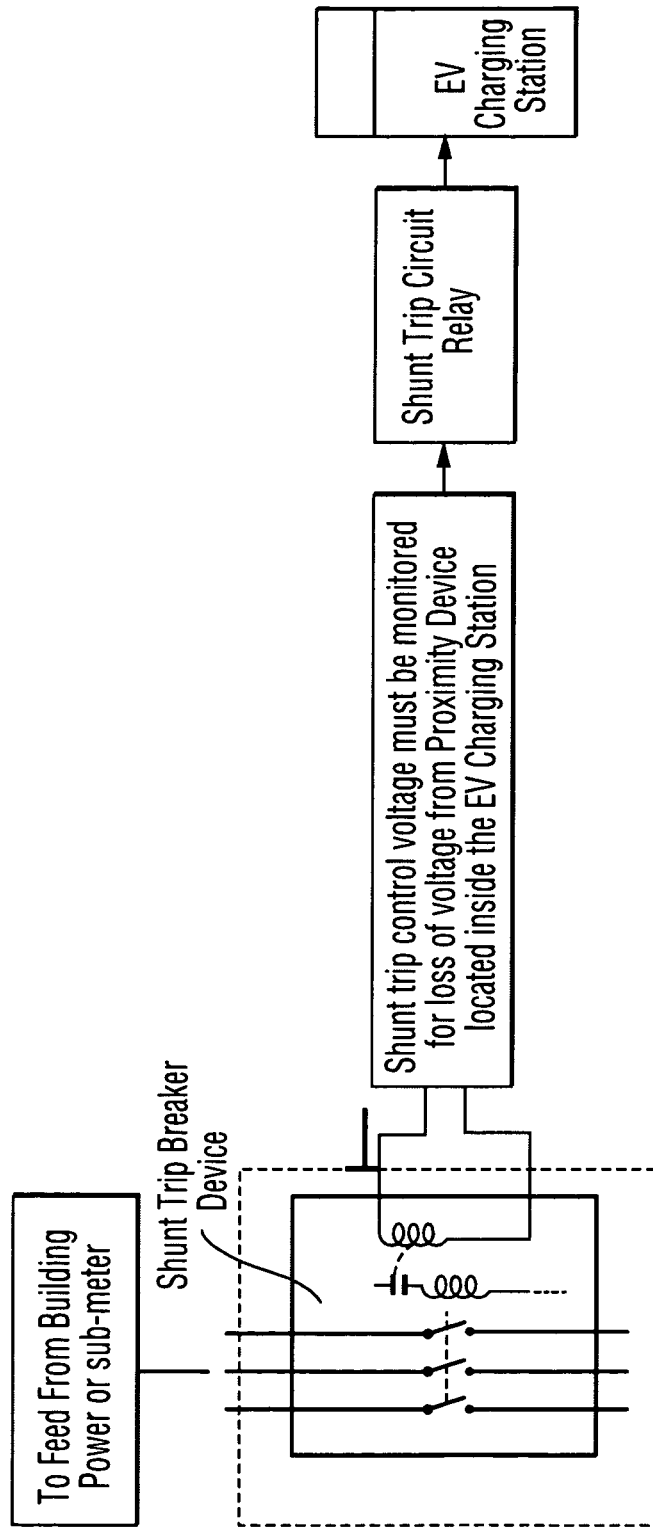
FIG. 8 is a flow chart of a safety system in accordance with the present invention.

As shown in FIG. 8, a safety system is implemented wherein the feed form the building power or submeter is connected to the shunt trip breaker device connecting to the shunt trip control voltage which must be monitored for loss or voltage from the proximity device located inside the EV charging station connecting to the shunt trip circuit relay connecting to the EV charging station.

Figure 9:
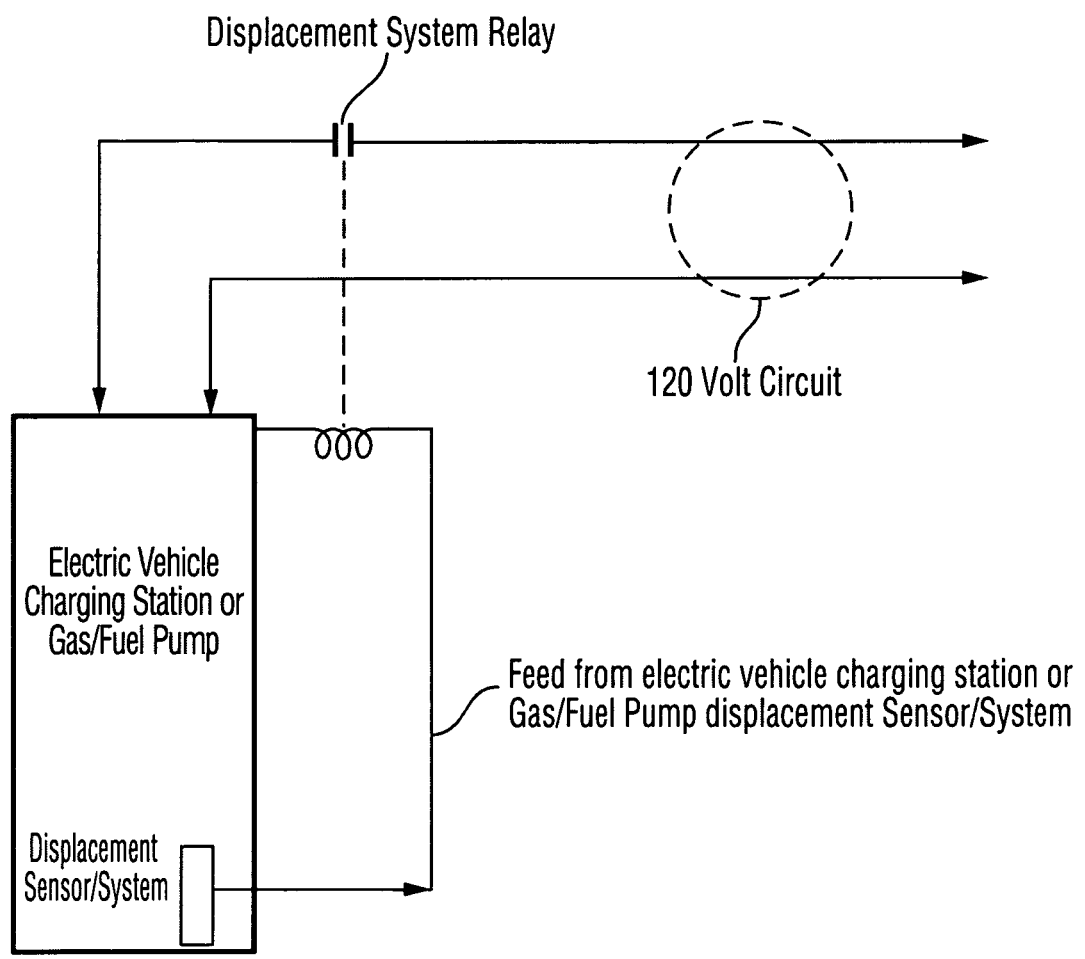
FIG. 9 is a flow chart of the safety system in proximity to an electric vehicle charging system.

FIG. 9 is a flow chart showing a flow chart of the safety system in proximity to an electric vehicle charging system. The shunt trip 100 with 120 volt coil on the circuit breaker or a shunt rip interconnecting to disconnect switch feeds power to the electric vehicle charging station or gas/fuel station pump. A displacement system relay 102 connects to operate the shunt rip circuit for disconnect or shunt trip circuit breaker off upon operation of electric vehicle charging station or fuel pump/station displacement system which is in electrical communication with the 120 volt circuit and a feed line 104 from the electric vehicle charging station or gas/fuel pump displacement sensor/system from the displacement sensor system 106 of the eclectic vehicle charging, station or gas/fuel pump 108.

Other embodiments of the present invention use other types of proximity sensors rather than inductive probes. Other types of sensors which are used to monitor the presence of selected targets include capacitance probes, optical sensors such as photocells, LVDT sensors (linear variable differential transformer), microwave sensors, absolute position encoders, eddy current sensors, Hall effect devices, piezoresistive accelerometers, servo accelerometers, force gages, laser Doppler vibrometers, tilt and vibration sensors, linear potentiometers, optical triangulation, ultrasonic sensors and limit switch sensors.

FIG. 5 shows a fuel dispensing unit 60 with the same safety system as that which is used in FIG. 1. Two inductive probes 24 and 34 are attached to the opposing side walls of enclosure 65. The sensors are monitoring the position of targets held within the center of target holders 26 and 36 as is done in the EV charging unit 10 in FIG. 1. The control circuitry 20 and power feed are the same as in FIG. 1. Fuel dispensing station 60 includes a dispensing unit which is supplied with fuel from pipe 64 and delivers fuel through a hose 66 to a nozzle 67 which is configured to deliver fuel to a vehicle's fuel tank. Various fuel dispensing units 60 are capable of dispensing gasoline, diesel, propane, natural gas, or hydrogen fuel, for example. Embodiments of these fuel dispensing units 60 are provided with the safety system of the present invention which include proximity sensors and control circuitry which removes incoming electrical power from the enclosure.

An alternative embodiment of the EV Charging station which uses a motion sensor such as a tilt and vibration sensor, a shock sensor or an accelerometer which may be embedded onto an electronic board is shown in FIG. 6. The motion sensor 102 can sense slight movements of a few thousandths of an inch. An enclosure protected by such devices does not require targets or other sensors such as the proximity sensors 24 and 34 of FIG. 1. The motion sensor 102 is embedded onto electronic board 100. Board 100 is a control board for the EV charge station and is located inside converter box 12 in the EV charging station 10 shown in FIG. 1. The motion sensor 102 senses a selected amount of movement and outputs a signal to electronic board 100 which in turn, causes the remote circuit breaker to trip which de-energizes the incoming voltage to the enclosure 10.

A further embodiment in FIG. 7 comprises a fuel pump enclosure 60 wherein motion sensor 102 on board 100 replaces sensors 24 and 34 and control unit 20 in the fuel pump enclosure 60 as well. Board 100 is located in control box 13. The motion sensor 102 senses a selected amount of movement and outputs a signal to electronic board 100 which in turn, causes the remote circuit breaker to trip which de-energizes the incoming voltage to the enclosure 60.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:

1. An electrical vehicle charging system consisting essentially of:
an enclosure including a power converter unit capable of receiving incoming power from a remotely located main circuit breaker and converting said incoming power to a selected DC voltage and current levels to charge at least one battery of said electrical vehicle, said enclosure being mounted on a foundation which is fixedly secured to the ground, said enclosure having one proximity sensor mounted to each of two opposing walls therein, said proximity sensors monitoring the presence of two respective targets, said targets being mounted onto said foundation, said proximity sensors each inputting a signal to control circuitry contained within said enclosure, said signals informing said control circuitry of the presence or absence of said targets, said control circuitry sending a trip signal to a remotely located shunt trip main circuit breaker in a situation wherein one or both of said proximity sensors senses that no target is present, thus causing a selected one of said main circuit breaker or said remotely located shunt trip main circuit breaker to trip removing power from said enclosure.

2. An electrical vehicle charging system consisting essentially of:
an enclosure including a power converter unit capable of receiving incoming power and converting said incoming power to a proper DC voltage and current levels to charge at least one battery of said electrical vehicle, said enclosure including an electronic board containing a motion sensor selected from the group consisting of inductive probes, capacitance probes, optical sensors such as photocells, LVDT sensors (linear variable differential transformer), microwave sensors, absolute position encoders, eddy current sensors, Hall effect devices, piezoresistive accelerometers, servo accelerometers, force gages, laser Doppler vibrometers, tilt and vibration sensors, linear potentiometers, optical triangulation, ultrasonic sensors, limit switch sensors, and combinations thereof, said sensor capable of sensing a selected amount of movement of said enclosure whereupon said electronic board sends a trip signal to a remotely located shunt trip main circuit breaker in response to a selected amount of movement of said enclosure as sensed by said motion sensor, thus causing said main circuit breaker to remove incoming power from said enclosure.

3. An electrical vehicle charging system consisting essentially of:
an enclosure including a power converter unit capable of receiving incoming power from a remotely located main circuit breaker and converting said incoming power to a selected DC voltage and current levels to charge at least one battery of said electrical vehicle, said enclosure being mounted on a foundation which is fixedly secured to the ground, said enclosure having one proximity sensor mounted to each of two opposing walls therein, said proximity sensors monitoring the presence of two respective targets, said targets being mounted onto said foundation, said proximity sensors each inputting a signal to control circuitry contained within said enclosure, said signals informing said control circuitry of the presence or absence of said targets, said control circuitry sending a trip signal to a remotely located shunt trip main circuit breaker in a situation wherein one or both of said proximity sensors senses that no target is present, thus causing a selected one of said main circuit breaker or said remotely located shunt trip main circuit breaker to trip removing power from said enclosure, said proximity sensors selected from the group consisting of inductive probes, capacitance probes, optical sensors such as photocells, LVDT sensors (linear variable differential transformer), microwave sensors, absolute position encoders, eddy current sensors, Hall effect devices, piezoresistive accelerometers, servo accelerometers, force gages, laser Doppler vibrometers, tilt and vibration sensors, linear potentiometers, optical triangulation, ultrasonic sensors and limit switch sensors.

\* \* \* \* \*